(12) United States Patent
Shim et al.

(10) Patent No.: US 9,495,805 B2
(45) Date of Patent: Nov. 15, 2016

(54) THREE DIMENSIONAL (3D) DISPLAY TERMINAL APPARATUS AND OPERATING METHOD THEREOF

(75) Inventors: Jung-hyun Shim, Gyeonggi-do (KR); Yong-yeon Lee, Gyeonggi-do (KR); Yeon-hee Lee, Seoul (KR); Ja-ok Koo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1050 days.

(21) Appl. No.: 13/331,778

(22) Filed: Dec. 20, 2011

(65) Prior Publication Data

US 2012/0162213 A1    Jun. 28, 2012

(30) Foreign Application Priority Data

Dec. 24, 2010  (KR) .......................... 10-2010-0134784

(51) Int. Cl.
| | | |
|---|---|---|
| *G06F 3/048* | (2013.01) | |
| *G06T 19/20* | (2011.01) | |
| *G06F 3/041* | (2006.01) | |
| *G06F 3/0484* | (2013.01) | |
| *G06F 3/0488* | (2013.01) | |

(Continued)

(52) U.S. Cl.
CPC .............. *G06T 19/20* (2013.01); *G06F 3/0416* (2013.01); *G06F 3/0488* (2013.01); *G06F 3/04815* (2013.01); *G06F 3/04845* (2013.01); *G06F 3/04847* (2013.01); *G06F 3/0483* (2013.01); *G06F 2203/0382* (2013.01);

(Continued)

(58) Field of Classification Search
CPC ............... G06F 3/04815; G06F 3/0483; G06F 3/0416; G06F 3/04845; G06F 3/04847; G06F 3/0488; G06F 2203/0382; G06F 2203/04101; H04N 13/0497; H04N 13/0051; H04N 13/0022; G06T 19/20; G06T 2219/2016
USPC .......................... 715/766, 782, 794, 848, 852
See application file for complete search history.

(56) References Cited

U.S. PATENT DOCUMENTS 5,347,295 A * 9/1994 Agulnick .............. G06F 1/1626
                                                        345/156
5,608,850 A * 3/1997 Robertson ..................... 345/427
(Continued)

FOREIGN PATENT DOCUMENTS

| CN | 1458565 | 11/2003 |
|---|---|---|
| CN | 101547253 | 9/2009 |

(Continued)

OTHER PUBLICATIONS

Mexican Office Action dated Jun. 20, 2014 issued in counterpart Application No. MX/a/2013/007308.

(Continued)

*Primary Examiner* — Patrick Riegler
(74) *Attorney, Agent, or Firm* — The Farrell Law Firm, P.C.

(57) ABSTRACT

An operating method of a three dimensional (3D) display terminal apparatus includes displaying a plurality of objects with different degrees of perceived depths, and changing display state of the plurality of objects according to a user's manipulation. The user's manipulation includes a plurality of touch modes which are perceived as different depths corresponding to the degrees of perceived depths, and the plurality of touch modes include a direct touch mode and a near touch mode. As a result, the terminal apparatus is operated with increased ease.

27 Claims, 11 Drawing Sheets

(51) Int. Cl.
*G06F 3/0481* (2013.01)
*G06F 3/0483* (2013.01)
*H04N 13/00* (2006.01)

(52) U.S. Cl.
CPC ............... *G06F 2203/04101* (2013.01); *G06T 2219/2016* (2013.01); *H04N 13/0022* (2013.01)

(56) References Cited

U.S. PATENT DOCUMENTS

| | | | |
|---|---|---|---|
| 5,821,931 A * | 10/1998 | Berquist et al. | 715/784 |
| 5,847,709 A | 12/1998 | Card et al. | |
| 6,753,888 B2 * | 6/2004 | Kamiwada et al. | 715/782 |
| 7,748,634 B1 * | 7/2010 | Zehr | G06F 1/1626 |
| | | | 235/375 |
| 8,375,334 B2 | 2/2013 | Nakano et al. | |
| 2001/0009420 A1 | 7/2001 | Kamiwada et al. | |
| 2002/0091739 A1 * | 7/2002 | Ferlitsch | G06F 17/24 |
| | | | 715/273 |
| 2004/0021663 A1 | 2/2004 | Suzuki et al. | |
| 2004/0100479 A1 | 5/2004 | Nakano et al. | |
| 2006/0143020 A1 * | 6/2006 | Zaima | 705/1 |
| 2008/0225007 A1 * | 9/2008 | Nakadaira | G06F 3/04815 |
| | | | 345/173 |
| 2009/0226080 A1 | 9/2009 | Boyd et al. | |
| 2009/0237372 A1 | 9/2009 | Kim et al. | |
| 2009/0287999 A1 * | 11/2009 | Ooi et al. | 715/702 |
| 2010/0095206 A1 * | 4/2010 | Kim | 715/702 |
| 2010/0279738 A1 * | 11/2010 | Kim et al. | 455/566 |
| 2010/0318914 A1 * | 12/2010 | Zitnick, III | G11B 27/034 |
| | | | 715/719 |
| 2011/0050687 A1 * | 3/2011 | Alyshev et al. | 345/419 |
| 2011/0078634 A1 * | 3/2011 | Klappert et al. | 715/850 |
| 2011/0093778 A1 * | 4/2011 | Kim et al. | 715/702 |
| 2011/0115880 A1 * | 5/2011 | Yoo et al. | 348/42 |
| 2011/0115887 A1 * | 5/2011 | Yoo | G06F 3/017 |
| | | | 348/51 |
| 2011/0141043 A1 * | 6/2011 | Soubrie | 345/173 |
| 2011/0164029 A1 * | 7/2011 | King et al. | 345/419 |
| 2011/0179368 A1 * | 7/2011 | King et al. | 715/769 |
| 2012/0075202 A1 * | 3/2012 | Michaelis | G06F 3/04886 |
| | | | 345/173 |
| 2012/0102435 A1 * | 4/2012 | Han | G06F 3/0482 |
| | | | 715/848 |
| 2012/0288184 A1 * | 11/2012 | Zomet | G02B 3/005 |
| | | | 382/154 |

FOREIGN PATENT DOCUMENTS

| | | |
|---|---|---|
| EP | 2 105 844 | 9/2009 |
| JP | 10-105735 | 4/1998 |
| JP | 2006-293878 | 10/2006 |
| JP | 2009295182 | 12/2009 |
| JP | 2010-257160 | 11/2010 |
| KR | 1020090105160 | 10/2009 |
| KR | 1020100093888 | 8/2010 |
| KR | 1020100101779 | 9/2010 |
| WO | WO 2009/028921 | 3/2009 |
| WO | WO 2009/151752 | 12/2009 |

OTHER PUBLICATIONS

Notice of Acceptance dated Feb. 17, 2015 issued in counterpart application No. 2011345468.
Australian Examination Report dated Nov. 6, 2014 issued in counterpart application No. 2011345468.
Chinese Office Action dated Mar. 24, 2015 issued in counterpart application No. 201180061539.2.
Chinese Office Action dated Oct. 23, 2015 issued in counterpart application No. 201180061539.2, 36 pages.
Japanese Office Action dated Nov. 30, 2015 issued in counterpart application No. 2013-546042, 7 pages.
Russian Office Action dated Dec. 15, 2015 issued in counterpart application No. 2013134461, 14 pages.
European Search Report dated Mar. 29, 2016 issued in counterpart application No. 11850279.8-1972, 8 pages.
Korean Office Action dated Aug. 13, 2016 issued in counterpart application No. 10-2010-0134784, 16 pages.

* cited by examiner

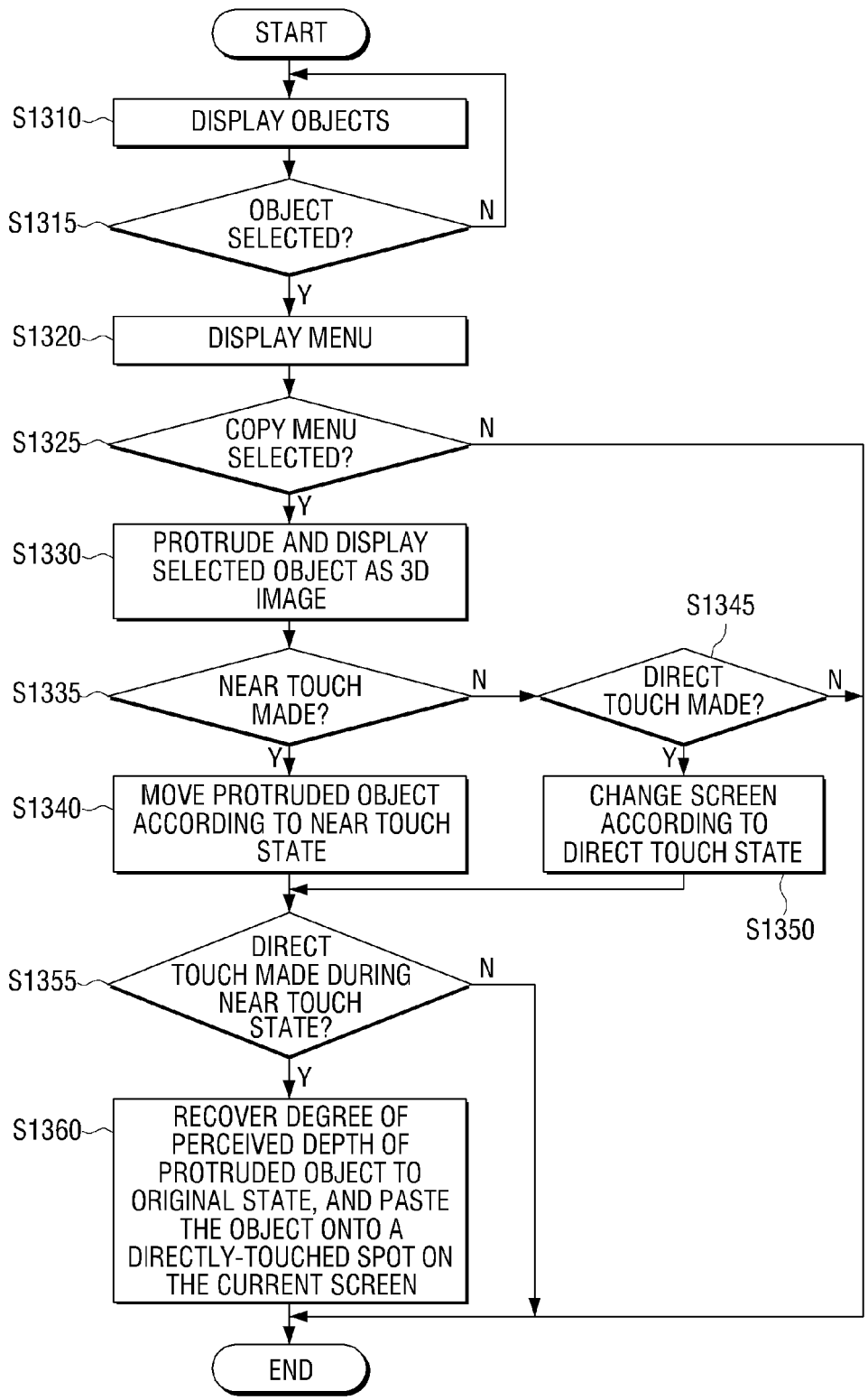

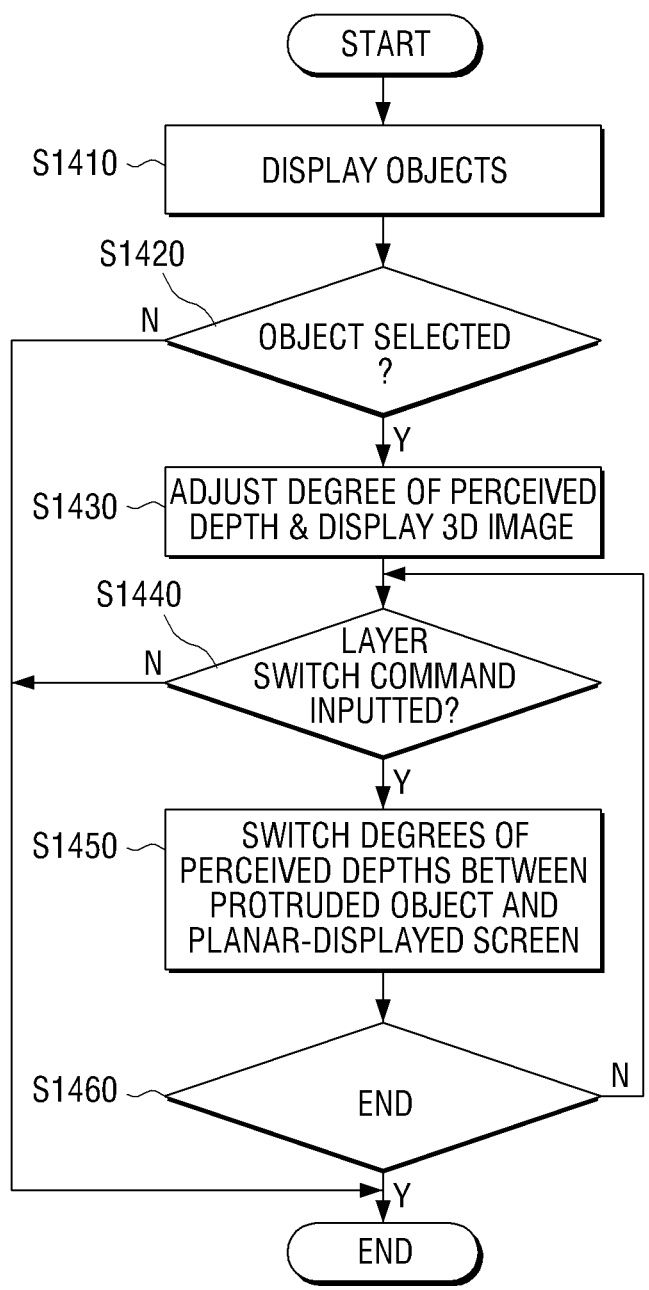

THREE DIMENSIONAL (3D) DISPLAY TERMINAL APPARATUS AND OPERATING METHOD THEREOF

PRIORITY

This application claims priority under 35 U.S.C. 119 to Korean Patent Application No. 10-2010-0134784, filed in the Korean Intellectual Property Office on Dec. 24, 2010, the contents of which are incorporated herein by reference.

BACKGROUND OF THE INVENTION

1. Field of the Invention

The present invention relates generally to a three dimensional (3D) image display, and more particularly, to a 3D display terminal apparatus which displays a plurality of objects with different degrees of perceived depths in a 3D display manner, and enables operation of the displayed objects by touch, and an operating method thereof.

2. Description of the Related Art

Development of electronic technology has led to the introduction and wide distribution of various types of mobile terminal devices. The 'smartphones' providing a variety of application services has recently been released, further improving the level of services provided by conventional mobile phones and gaining escalating popularity.

Users of the terminal apparatuses such as smartphones can access various services, such as document editing or email transmission. Through such services, it is also possible to select and copy content such as pictures or photos, and paste these onto other documents or applications.

However, these terminal apparatuses have limited selection and use of content, mainly because their display sizes are limited for portability purposes. For example, it is difficult for a user, who has copied and pasted content, to check the copied content once the page is changed.

Accordingly, a method is necessary, by which users are enabled to operate the terminal devices with increased ease and convenience.

SUMMARY OF THE INVENTION

Embodiments of the present invention are directed to overcoming the above and other disadvantages of the prior art.

According to the present invention, a 3D display terminal apparatus disclosed, which displays a plurality of objects with different degrees of perceived depths, and enables the respective objects to be selected and activated according to a plurality of touch modes corresponding to the respective degrees of perceived depths, and an operating method thereof.

A method for operating a 3D display terminal apparatus includes displaying a plurality of objects with different degrees of perceived depths, and changing a display state of the plurality of objects according to a user's manipulation, which comprises a plurality of touch modes perceived as different depths corresponding to the perceived depths.

The method additionally includes, prior to displaying the plurality of objects with different degrees of perceived depths, displaying objects with same degrees of perceived depths, and if one object is selected from among the objects, adjusting a degree of perceived depth of the selected object.

The method further includes, prior to displaying the plurality of objects with different degrees of perceived depths, displaying screens comprised of objects with same degrees of perceived depths, if one object is selected from the screens, displaying a menu select window on one side of the selected object, and if a copy menu is selected from the menu select window, adjusting a degree of perceived depth of the selected object.

The method additionally includes, prior to displaying the plurality of objects with different degrees of perceived depths, displaying a screen comprised of objects with same degrees of perceived depths, and if one object is touched on the screen, and the touch state rotates to a preset direction or moves in a preset pattern, adjusting the degree of perceived depth of the selected object.

A 3D terminal apparatus is provided, and includes a display unit which displays a plurality of objects with a same degree of perceived depth, a converting unit which adjusts the degree of perceived depth of a selected object from among the plurality of objects if one object is selected from the plurality of objects, and a control unit which perceives a user's manipulation according to a plurality of touch modes that perceive touches of different depths corresponding to the degrees of perceived depths of the respective objects, and controls the display unit and the converting unit to change display states of the objects.

The 3D display terminal apparatus may additionally include a first sensor unit which detects a direct touch by which a screen of the display unit is directly touched, and a second sensor unit which detects a near touch by which a touch is made within a predetermined distance range to the screen of the display unit.

BRIEF DESCRIPTION OF THE DRAWINGS

The above and/or other aspects of what is described herein will be more apparent by describing embodiments with reference to the accompanying drawings, in which:

FIGS. 12 to 14 illustrates an operating method of a 3D display terminal apparatus according to embodiments of the present invention.

DETAILED DESCRIPTION OF EMBODIMENTS OF THE INVENTION

Figure 1:
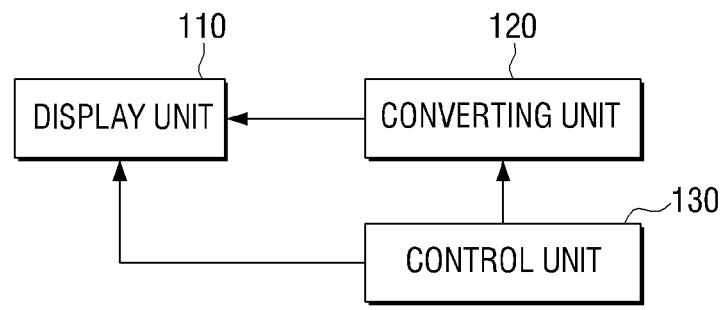
FIG. 1 illustrates a 3D display terminal apparatus according to the present invention.

Embodiments of the present invention will be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. Throughout the drawings, the same drawing reference numerals will be understood to refer to the same elements, features and structures.

In addition, descriptions of well-known functions and constructions are omitted for the sake of clarity and conciseness.

FIG. 1 illustrates a 3D display terminal apparatus according to the present invention. The display terminal apparatus of FIG. 1 may be implemented as a mobile terminal such as a mobile phone, a Personal Data Assistant (PDA), a laptop computer, a tablet Personal Computer (PC), an electronic frame, an electronic book, or an MPEG Layer Audio 3 (MP3) player, or other terminal forms such as a television.

Referring to FIG. 1, the 3D display terminal apparatus includes a display unit 110, a converting unit 120, and a control unit 130.

The display unit 110 outputs a screen including at least one object, which refers to a sign indicative of one independent meaning including text, picture, or photo on a screen, or various types of icons such as menu or folder icons.

In standby mode, the display unit 110 may output icons corresponding to various application programs installed in the terminal apparatus, or menu icons prepared for activating corresponding applications. If a specific application or menu is selected, a screen corresponding to the selected application or menu is displayed. The display screen may include various forms and sizes of pictures, photos, or menus.

The converting unit 120 adjusts the degree of perceived depth of a selected object, if the object is selected from among the objects displayed on the screen by the display unit 110. The degree of perceived depth herein refers to a degree by which the object appears to protrude or sink with respect to the plane of the screen. That is, by the 3D display method, the user is given a perception of depth due to disparity between left-side and right-side images.

The converting unit 120 converts the image of the corresponding object into 3D data to adjust the degree of perceived depth of the selected object. The 3D display method may be glass or non-glass type, depending on whether glasses are used.

That is, if the 3D display terminal apparatus is glass type requiring that the user wear dedicated glasses, the converting unit 120 generates left-eye and right-eye images of the selected object. The left-eye and right-eye images herein are obtained by viewing an object from different points of view. The perception of depth, i.e., the degree of perceived depth can be the distance between blocks corresponding to the left-eye and right-eye images, respectively.

The display unit 110 outputs the left-eye and right-eye images generated at the converting unit 120 alternately by a number of times. The control unit 130, using a separately-provided synchronous signal transmitting unit (not illustrated), transmits a sync signal in synchronization with the alternate output timing of the left-eye and right-eye images to the 3D glasses. Accordingly, the 3D glasses turn on the left-side and right-side glasses in accordance with the sync signal to provide 3D images to the user.

When the 3D display terminal apparatus is non-glass type, thereby not requiring the user to wear dedicated glasses, the converting unit 120 converts the image of the selected object into multiview point image and provides the converted image to the display unit 110.

Specifically, the converting unit 120 estimates a degree of variation of distance or direction to an object when a focal point changes, using focal distance, or depth of an object, with reference to an image signal. Depending on the result of estimation, the converting unit 120 generates a new image by moving locations of the respective pixels of a reference image. The generated image may be an image acquirable by viewing an object from an angle apart from the reference image. The converting unit 120 may generate a plurality of multiview point images in this manner.

The display unit 110 spatially-divides the multiview image and outputs the result so that a user can perceive a distance to an object and see a 3D image without having to wear dedicated glasses. For example, if nine multiview point images are generated, the multiview point images are outputted from one side of the screen in sequence, and at an end where the last image is outputted, i.e., where the ninth image is outputted, the images are outputted again from the first image at varying angles and toward the front direction of the screen. Accordingly, even without wearing glasses, the user can perceive depth. Meanwhile, the number of multiview point images is not limited to nine, and the number of display directions may also vary according to the number of multiview point images. Further, to output multiview point images, the display unit 110 may include display panels according to parallax barrier, or lenticular technology.

The control unit 130 perceives user manipulation according to a plurality of touch modes in which the control unit 130 perceives varying depths of touches, which correspond to the degrees of perceived depths of the respective displayed objects. Accordingly, the control unit 130 controls the display unit 110 and the converting unit 130 to change the display status of the objects according to the user manipulation.

The touch modes may be implemented in various manners, such as including at least two of a near touch mode in which a user selects an object at a distance from the screen, a direct touch mode in which the user selects an object by directly touching the screen, a pressing mode in which the user selects an object by varying touch pressure while keeping a direct contact with the screen, and a long press mode in which the user selects an object by varying a time of directly touching the screen.

For an object which protrudes out from the screen in 3D display mode, the control unit 130 may control so that the operation is performed in the near touch mode in which a corresponding object is perceived as being selected when the user places his or her finger or the like over the object at a distance. That is, the user does not directly touch the screen.

Conversely, for a two-dimensional (2D) object, which is directly displayed on the screen, the operation may be performed in the direct touch mode in which the user can select the object by directly touching on the screen.

Additionally, for an object perceived as being sunken into the screen in 3D display mode, the operation of perceiving selection of an object may be performed in the pressing mode or the long press mode. That is, an object displayed on the screen may be perceived as being selected if a simple touch is inputted, while a sunken object may be perceived as being selected if the object in touch is pressed with a strength exceeding a threshold or for a longer duration than the threshold.

These touch modes may be combined and used in various manners. For example, the near touch mode and the direct touch mode may be applied in combination. Alternatively, the pressing mode or the long press mode and the direct touch mode and the near touch mode may be applied in combination. In the above example, an object protruding out from the screen, an object displayed on the screen plane, and an object sunken into the screen may be appropriately selected according to the degrees of perceived depths thereof by the near touch, direct touch, pressing or long press mode.

The near touch mode may be subdivided into a plurality of near touch modes according to the distances to the screen. The pressing mode may also be subdivided into a plurality of pressing modes according to a level of touch pressure. The long press mode may also be subdivided into a plurality of long press modes according to the duration of touch time.

Figure 2:
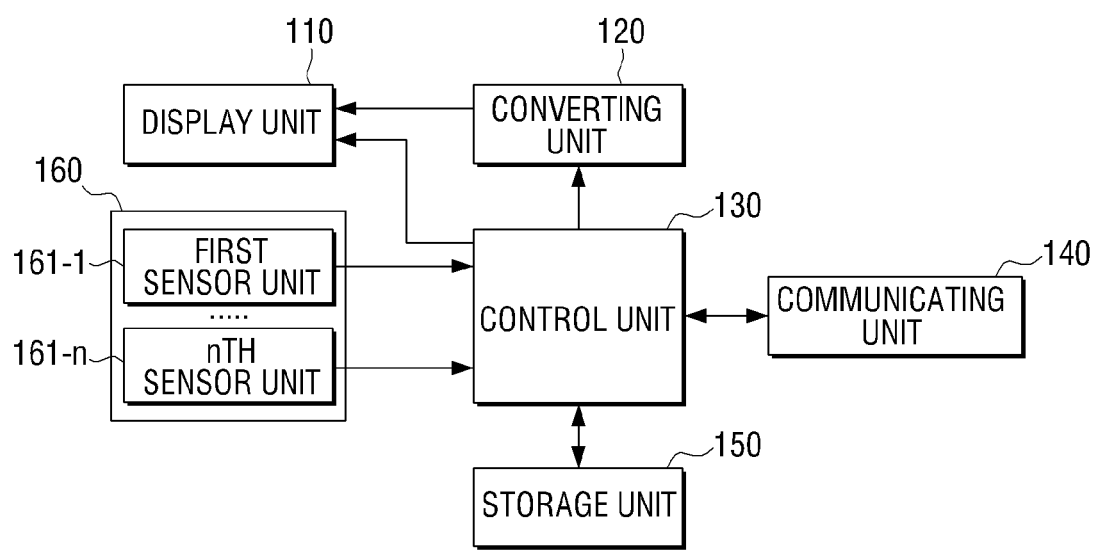
FIG. 2 illustrates an example of the 3D display terminal apparatus of FIG. 1.

FIG. 2 illustrates a 3D display terminal apparatus according to the present invention. Referring to FIG. 2, the 3D display terminal apparatus includes the display unit 110, the converting unit 120, the control unit 130, a communicating unit 140, a storage unit 150, and a sensor unit 160.

The operation of the display unit 110, the converting unit 120 and the control unit 130 will not be explained in detail below, but referred to the previous description provided above with reference to FIG. 1.

The communicating unit 140 may be connected to an external source via wired/wireless interface to download or upload various programs and data, and may access a corresponding server and receive content, if Uniform Resource Locator (URL) of the external server is inputted or a specific application is executed.

The storage unit 150 stores various programs and data, as well as data newly inputted, set, or generated during a process that the application program is executed. The storage unit 150 may also store left-eye and right-eye images for 3D display, or multiview point images.

The sensor unit 160 senses user motion or touch and notifies the sensed result to the control unit 130. The sensor unit 160 may include a plurality of first to nth sensor units 161-1 to 161-n corresponding to the plurality of touch modes.

The first sensor unit 161-1 may sense a direct touch of the user who directly touches on the screen of the display unit 110, and the second sensor unit 161-2 may sense the near touch by the user within a distance range to the screen of the display unit 110.

Figure 3:
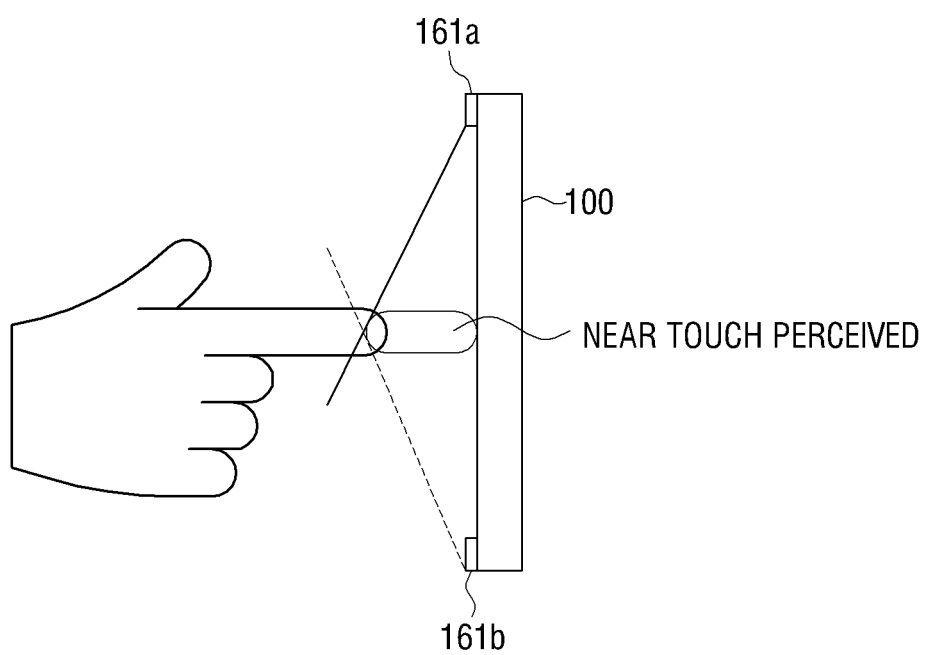
FIG. 3 illustrates an example of a method for sensing adjacent touching, according to the present invention.

The second sensor unit 161-2 may be constructed in various manners to sense the near touch by various methods, and may sense the near touch in a light-emitting/light-receiving manner, as shown in FIG. 3.

Referring to FIG. 3, the second sensor unit 161-2 includes a light emitting element 161a and a light receiving element 161b. The light emitting element 161a may emit light at an angle so that optical spot gradually enlarges. The light receiving element 161b provides the control unit 130 with an electric signal corresponding to a degree of receiving the light emitted from the light emitting element 161a. The amount of light sensed at the light receiving element 161b decreases and the size of electric signal provided to the control unit 130 subsequently varies, as the user's finger or the like approaches the direction of the screen of the 3D display terminal apparatus 100 and blocks the light in the process.

The control unit 130 may determine whether there has been a near touch according to the degree of variation of the size of the electric signal. For example, the control unit 130 may determine that the user made a near touch, when determining that a difference between the size of the optical spot estimated according to distances to the light emitting element 161a, and the size of the optical spot size corresponding to the actually-detected luminous flux exceeds a range.

Alternatively, the second sensor unit 161-2 may include a Charge-Coupled Device (CCD), which is used to photograph a front direction of the screen, and the control unit 130 may determine that a near touch has been made when determining that a photographed object is within a distance to the screen based on the photographed results.

Alternatively, the second sensor unit 161-2 may be implemented as a capacitive sensor. That is, if the size of capacitance varies to exceed a threshold as the user's finger moves closer to the screen, the control unit 130 may perceive that a near touch has been made.

If the plurality of touch modes additionally includes the pressing mode or long press mode, the sensor unit 160 may additionally include a pressure sensor or timer.

That is, in the pressing mode, the pressure sensor may be arranged inside the screen of the display unit 110 to detect a variation of pressure at a location where the touch is made. Accordingly, objects on different layers are perceived as being selected depending on if the user presses the location with pressure or if he simply touches on the location. For example, a 3D object, sunken into the lower portion of the screen, may be perceived as being selected if the user presses the screen with pressure, while an object displayed on the screen may be perceived as being selected if the user simply touches the screen.

In the long press mode, objects on different layers may be perceived as being selected depending on if the user maintains the touch at a location on the screen for more than a time duration from the time the user starts touching the location, or if the user stops touching on the location within the time duration. In this example, a timer (not illustrated) may additionally be used, and the control unit 130 may control the timer to count the time between when the touch is sensed through the touch sensor and when the touch is stopped.

Figure 4:
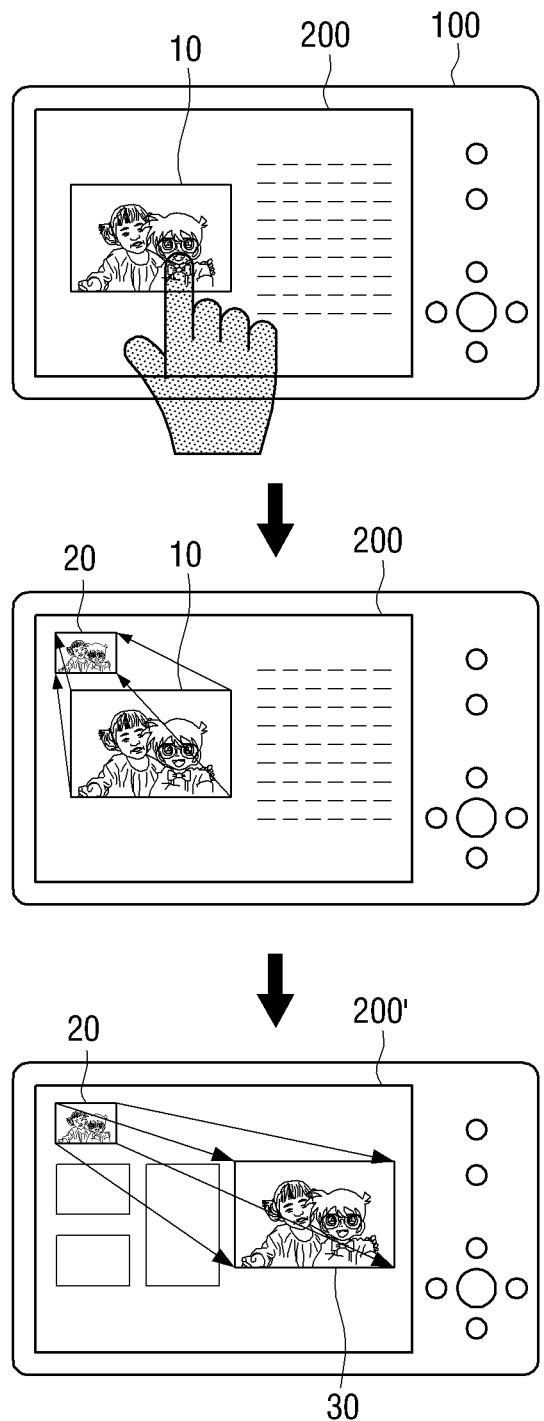
FIG. 4 illustrates an example of displaying a plurality of objects with different degrees of depth from each other, according to the present invention.

FIG. 4 illustrates a screen of a 3D display terminal apparatus according to the present invention.

Referring to FIG. 4, a content screen 200, containing at least one object 10, may be displayed on the 3D display terminal apparatus 100. If the user selects one object 10, the degree of perceived depth of the selected object is adjusted. As a result, 3D display is applied, expressing the selected object and the other objects at different degrees of perceived depths.

FIG. 4 particularly illustrates an example in which a 3D image 20 protrudes out from the screen 200 in a vertical direction, while the selected object 10 remains displayed on the original screen plane. The 3D image 20, i.e., the protruding object 20 may be in identical size to that of the original object 10, or in a reduced size at a predetermined rate. The protruding object 20 may be displayed above the original object 10, or on an upper portion of an area where there is no content arranged on the screen.

In a state that the protruding object 20 and the original screen 200 are displayed at different layers with different degrees of perceived depths, the user operates the protruding object 20 in the near touch mode, while operating the original screen 200 in the direct touch mode. The user changes the screen 200 to another screen 200' by a direct touch. The protruding object 20 remains displayed on the layer different from the original screen 200 even when the screen changes.

On the changed screen 200', if the user selects the protruding object 20 by the direct touch mode and the moves a point of selection, the location at which the protruding object 20 is displayed moves. If the user directly touches on the screen during such moving, referring to FIG. 4, the protruding object 20 is pasted directly on the touched location on the original screen 200. The protruding object 20 disappears, and the degree of perceived depth of the object 20 pasted on the original screen 20 is returned to the original state. That is, the object 20 is displayed on the same layer as the original screen 200. As explained above, easy copy & paste function is carried out by the plurality of touch modes.

Figure 5:
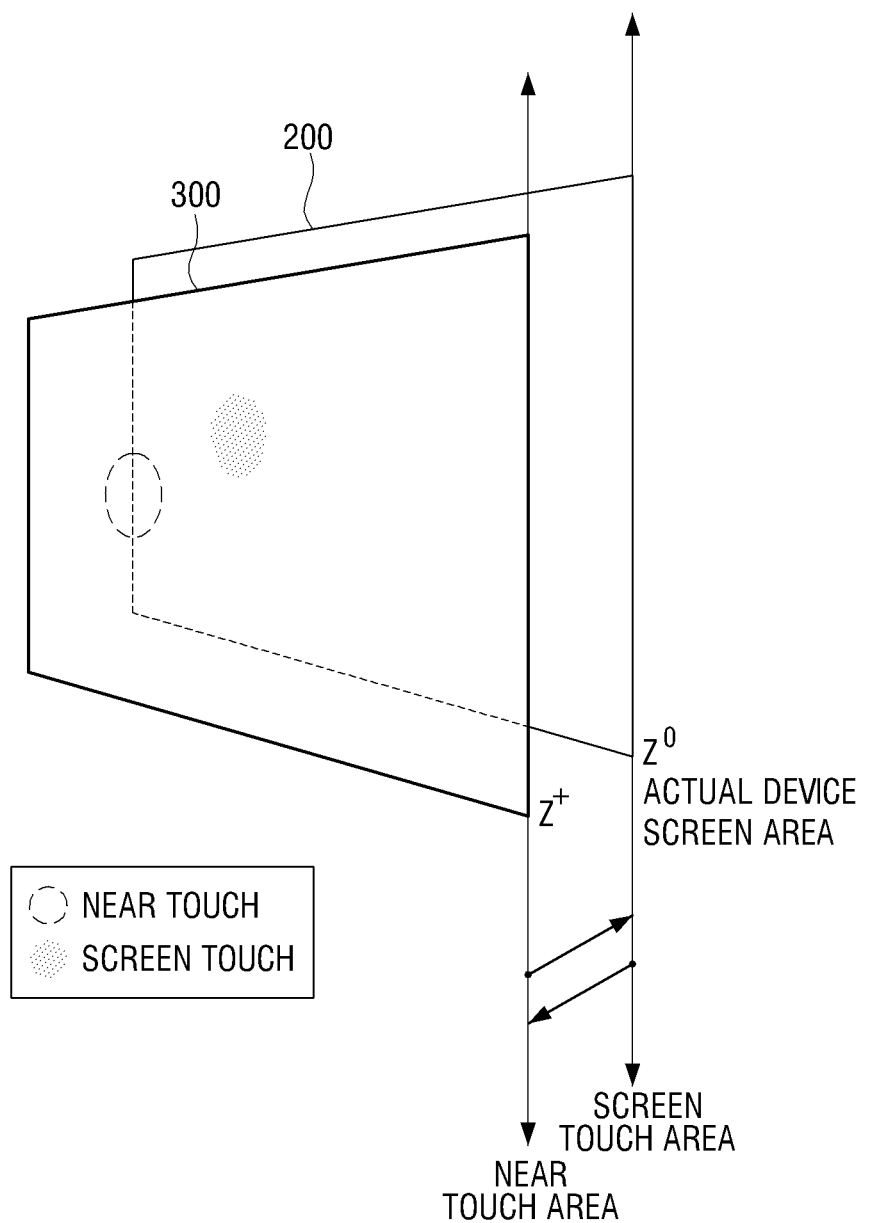
FIG. 5 illustrates a difference between display states of the objects with varying degrees of depth and corresponding touching method, according to the present invention.

FIG. 5 illustrates layers of different degrees of perceived depths from each other, according to the present invention. Referring to FIG. 5, assuming that the actual screen of the 3D display terminal apparatus is X-Y plane, the original screen 200 is displayed with $Z^0$ depth, while the protruding object is displayed on a layer (Z+) 300 at a predetermined height in the $Z^+$ axis direction. The object is selected and operated by near touch mode on the $Z^+$ layer 300, while the object is selected and operated by direct touch mode on the $Z^0$ layer 200. Although one $Z^+$ layer 300 is illustrated in FIG. 5, a plurality of $Z^+$ layers may be provided depending on the degrees of perceived depths of the protruding object. The plurality of $Z^+$ layers may be generated by setting disparities among the images to various values. Further, although $Z^+$ alone is illustrated in FIG. 5 as the layer protruding from the screen, a $Z^-$ layer (not shown), which sinks from the screen, may also be used.

Figure 6:
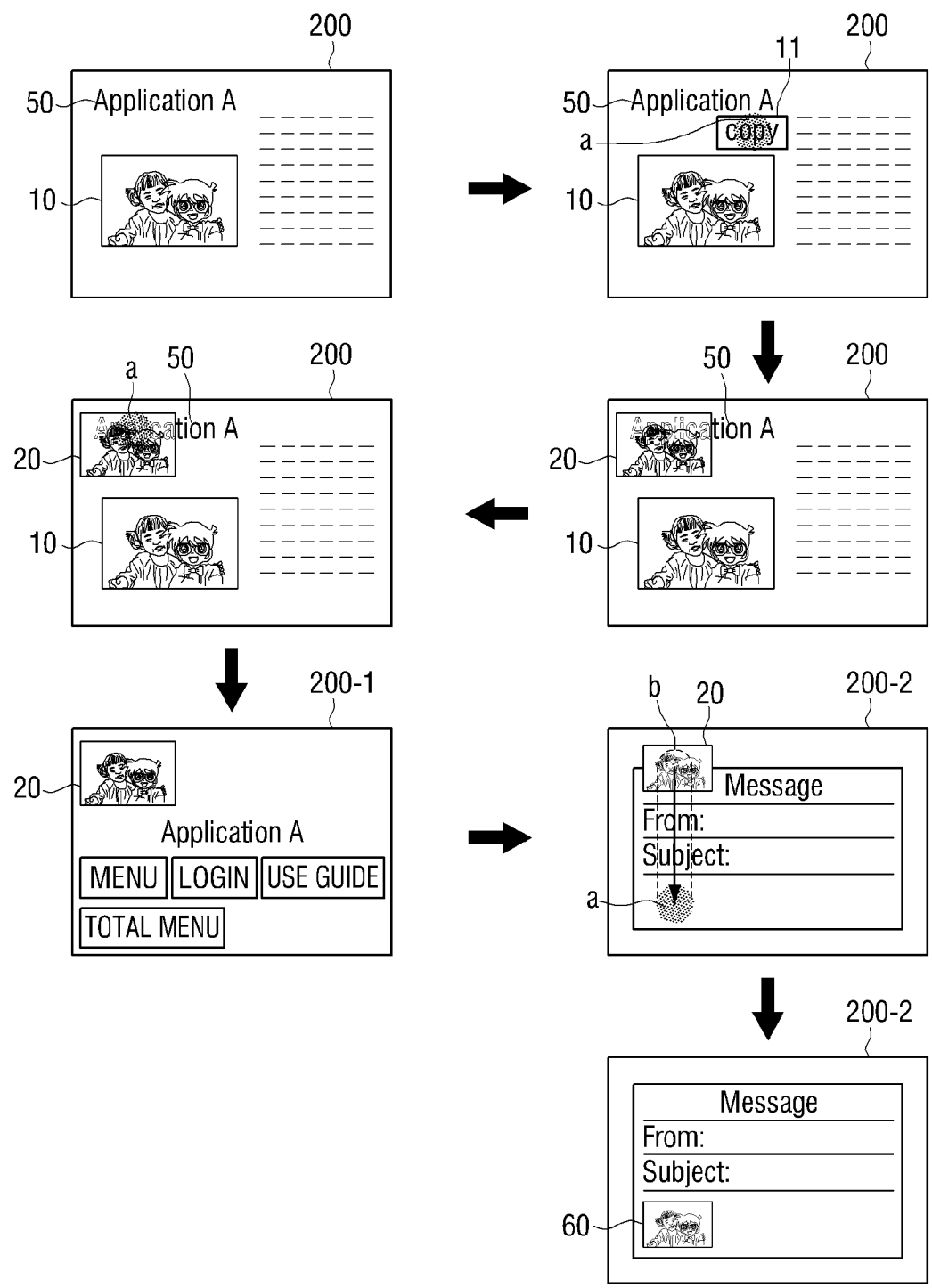
FIGS. 6 to 11 illustrate an operating method according to embodiments of the present invention.

FIG. 6 illustrates a method for operating a 3D display terminal apparatus according to the present invention.

Referring to FIG. 6, when an application "APPLICATION A" is executed, the application screen 200 is displayed, and an object 10 may be displayed on the screen 200.

Then, as the user directly touches on the object 10, an area 11 to select menus is displayed on one side of the object 10. The area 11 may be represented as a graphic image as illustrated in FIG. 6, or as a menu area generated at one side of the screen 200. The area 11 may include menus such as "COPY" (FIG. 6) or various other menus therein.

The user directly re-touches the "COPY" menu. For conciseness of explanation, a spot "a" which is directly touched, is represented as "●". If the "COPY" menu is directly touched, the 3D image 20 corresponding to the selected object 10 is displayed, and is be overlapped with part of the original screen 200. Referring to FIG. 6, the "APPLICATION A" menu 50, directing to return to the main screen of APPLICATION A overlaps with the original screen 200. Although they overlap each other, the respective images 20, 200 are easily distinguishable for the user by depth perception, i.e., since the 3D image 20 protrudes vertically from the screen.

In this state, the user may select the 3D image 20 or the original screen 200, the 3D image 20 by near touch mode, or the original screen 200 by direct touch (a). Referring to FIG. 6, if the user directly touches the area of the 3D image 20, the "APPLICATION A" menu 50 below the 3D image 20 is selected. Accordingly, the screen below the 3D image 20 changes, while the 3D image 20 is maintained. That is, since the "APPLICATION A" menu 50 is directly touched, the screen changes to the main screen 200-1 of the corresponding application. Even in this state, the user may execute different application by touching on the original screen. For example, the user may change to a main application screen 200-2 as illustrated in FIG. 6. Then, if the user selects the 3D image, i.e., the protruding object 20 by the near touch (b), keeps touching on the object 20 and drags the content within a message window by direct touch (a), the object 60 corresponding to the content is pasted and displayed, and the protruding object 20 disappears.

An object select and copy menu may be inputted according to a user motion, instead of using the menu 11 illustrated in FIG. 6.

Figure 7:
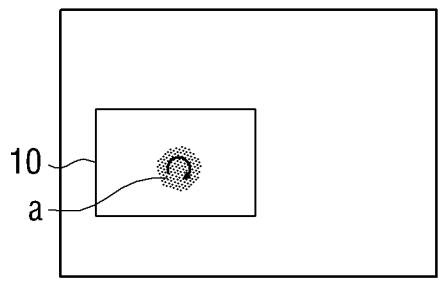

Referring to FIG. 7, the user directly touches on the object 10 and rotates his/her finger in contact in a clockwise direction. If the finger in contact is rotated in this direction, such is perceived as an intent of the user to copy a corresponding object 10. Accordingly, the protruding object 10 may be displayed with adjusted degree of perceived depth, i.e., displayed as a 3D image.

Figure 8:
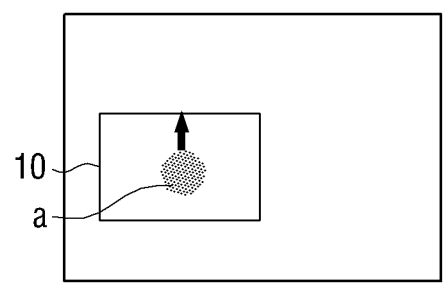

Referring to FIG. 8, which illustrates another example of operating a 3D display terminal apparatus according to the present invention, the user may directly touch on the object 10 and move his/her finger in contact to another point according to a preset pattern. For example, if the user moves his finger to another point with a set speed or less, such is perceived as a user command to move the location of the object. Accordingly, the object is moved. If the finger in touch is moved faster than the set speed, such is perceived as a user's intention to copy the corresponding object 10, so the degree of perceived depth of the corresponding object 10 is adjusted so that the object 10 is displayed as a 3D image. If the user touches on the object 10 and makes a gesture as if he/she is pushing the object 10 upward, the object may be protruded in the $Z^+$ direction in 3D.

Alternatively, the user may appropriately manipulate objects of different degrees of perceived depths, using the layer-changing mode with the touch modes.

Figure 9:
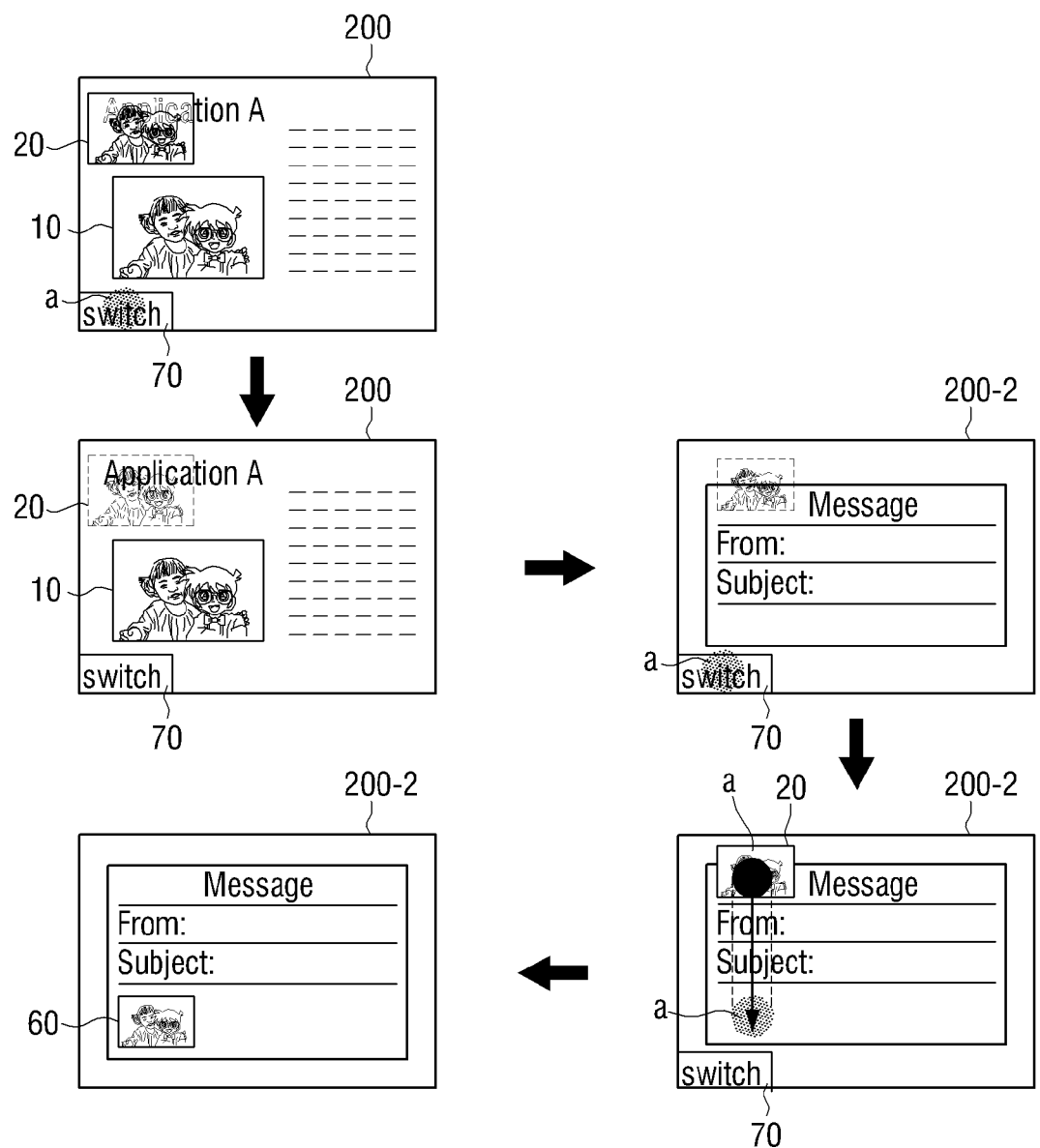

Referring to FIG. 9, if the object 10 is selected on the screen 100 and displayed as a 3D image 20, a menu such as "Switch" 70 may appear on an area of the screen 100. The "Switch" menu 70 is used to input a command to change a layer.

When the selected object 10 is protruded and displayed as the 3D image 20 on the $Z^+$ layer and the original screen 200 is displayed on the Z0 layer, if the user directly touches "a" on the "Switch" menu 70, the original screen 200 is displayed in 3D on the $Z^+$ layer, and the protruding image 20 is returned to the $Z^0$ layer. Then if the user re-selects the "Switch" menu 70, the degrees of perceived depths of the contents are once again switched. As explained above, the protruding image 20 and the original screen 200 may be alternately displayed on exchanged layers according to a command to switch the layers. The content displayed on $Z^+$ layer may also be selected by direct touch mode.

That is, the user selects and copies one object 10 from the screen on which the objects are initially displayed with the same degree of perceived depth. The 3D display terminal apparatus displays the same image as the selected object 10 as the 3D image 20. Then the user selects the command to switch layers, so that the original screen 200 is maintained on the upper layer, while the 3D image 20 is displayed on the lower layer. In this state, the user switches the screen by directly touching on the original screen 200. The 'screen switch' herein may include not only page turning, but also displaying of a screen according to execution of a new application. As explained above, the user selects a screen 200-2 on which the copied content will be used, by inputting a command to switch layers, so that the 3D image 20 moves back on the upper layer, and dragging the direct touch area "a". As the user completes dragging, the 3D display terminal apparatus pastes the corresponding image 20 of an area where the dragging is stopped, and displays the object 60.

By applying the direct touch mode along with the layer-switching mode, it is possible to manipulate the objects using 3D display method, and the apparatus does not have to be equipped with a sensor to detect the near touch.

Although the "Switch" menu is indicated on the screen 100 in FIG. 9, this is shown only for illustrative purposes and alternative examples are possible. For example, the 3D display terminal apparatus may include a key provided on its main body to perceive a selection of the layer-switching menu when the key is selected. Alternatively, the 3D display terminal apparatus may be equipped with a geomagnetic sensor, gyro sensor, or acceleration sensor, and perceive the layer switching command if the user shakes the terminal apparatus, or rotates the apparatus causing pitch, roll and yaw angles to change. Using the layer switching command, the user is able to exchange layer of the protruding object 20 (i.e., $Z^+$ layer) with the layer of the original layer (i.e., $Z^0$ layer) with each other.

The objects explained above may include content such as pictures or photos, or text content, but are not limited thereto. For example, the objects may include icons. That is, a plurality of touch modes are applicable not only to copy & paste function, but also to moving menu icons.

Figure 10:
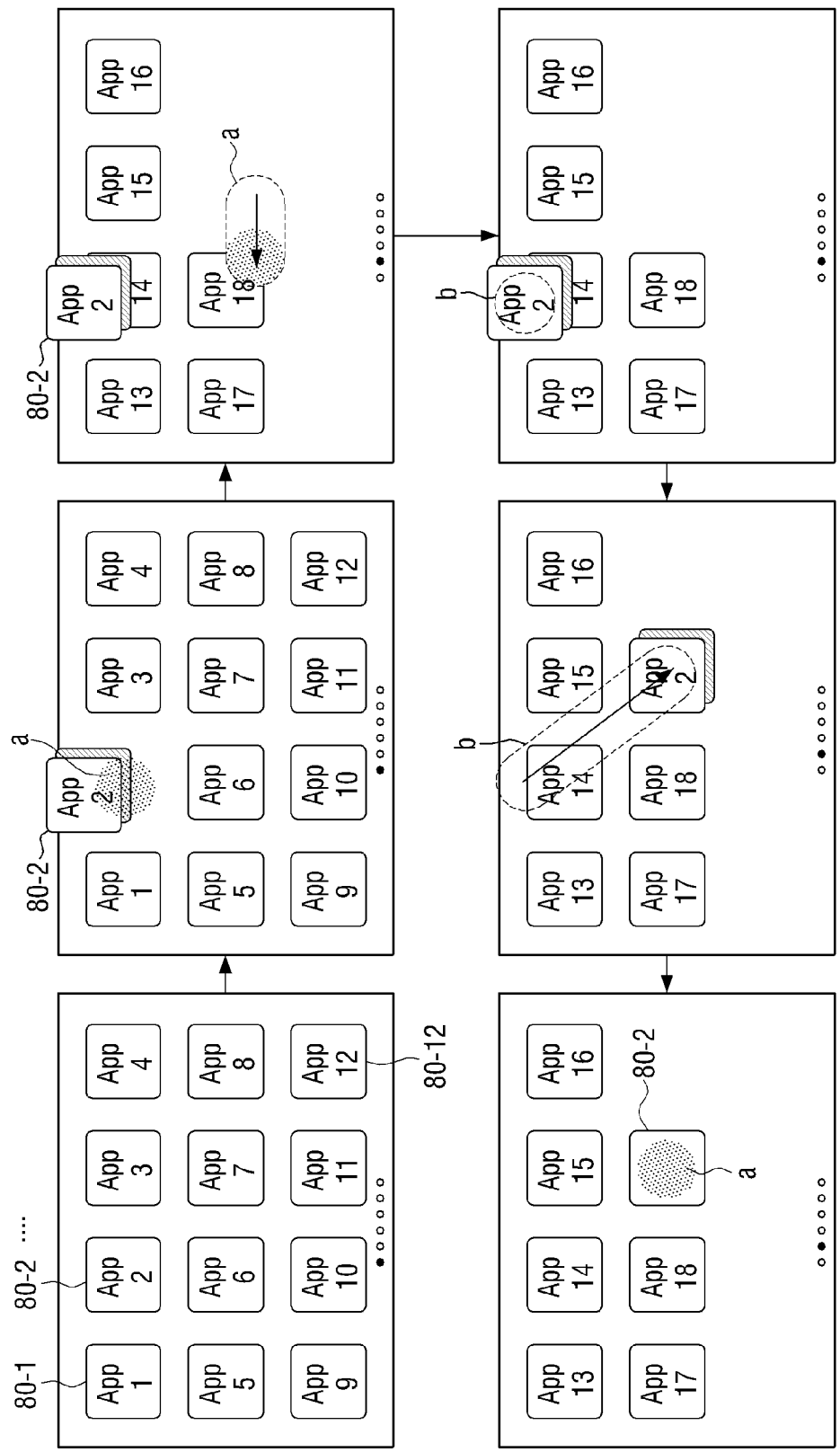
Figure 11:
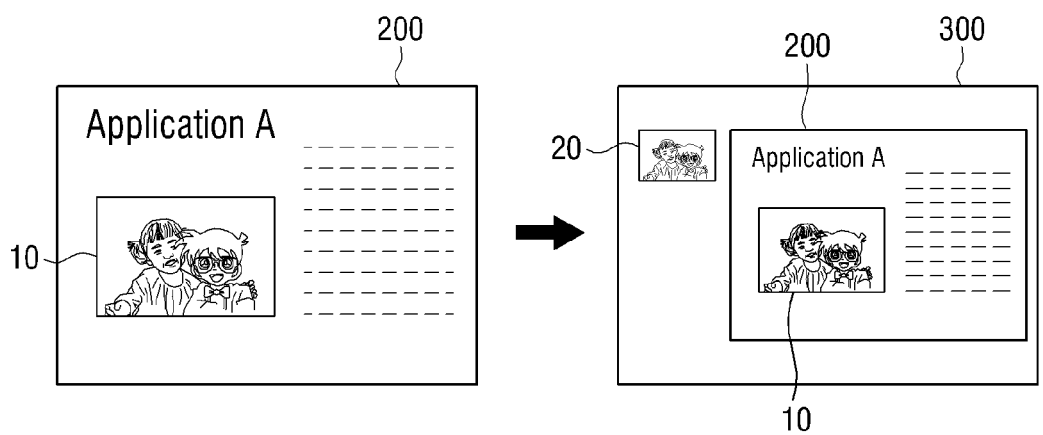

FIG. 10 illustrates a 3D display terminal apparatus according to an embodiment of the present invention.

Referring to FIG. 10, various icons 80-1, 80-2, . . . , 80-12 are displayed on the screen of the terminal apparatus 100. The icons may correspond to applications, or to folders stored in the terminal apparatus 100. The icons may also be constructed on different page units, if there are too many icons to be displayed on one page. FIG. 10 illustrates an example in which twelve icons are displayed on one screen.

Referring to FIG. 10, if one icon, for example, the second icon 80-2 is selected by the direct touch "a", the degree of perceived depth of the selected second icon 80-2 is adjusted and the selected second icon 80-2 is displayed as a 3D image. The second icon 80-2 on the original position may be deleted. Then, if the user keeps directly touching "a" on the screen and moves his/her finger in contact to a predetermined direction with a set speed or more, pages are switched according to the direction where the finger moves so that the next page is displayed. That is, the page, on which $13^{th}$ and $18^{th}$ icons are displayed, is displayed. When the screen is switched, the user touches on the second icon 80-2, which is protruded, by near touch "b" and moves the second icon 80-2 close to the $18^{th}$ icon, and directly touches "a" on the screen, so that the second icon 80-2 is displayed beside the $18^{th}$ icon. In this manner, the user may conveniently arrange the icons at different locations using direct and near touches.

Although in the above description the selected object is 3D-displayed in the $Z^+$ or $Z^-$ axis direction, the objects may be divided and displayed by different methods if the apparatus does not support 3D display or the data is not displayable as a 3D image.

Alternatively, if the object 10 is selected from the screen 20, the size of the currently-displayed screen 200 is reduced to be included in an area of a new screen 300, and the image 20 of the selected object 10 is newly displayed on one side thereof. That is, if the screen is in X-Y plane, the image of the selected object 10 may be displayed in X-axis or Y-axis direction. In this state, the user may change to a new screen by touching on the reduced screen 200. Accordingly, as a new screen appears, the user touches on a separately-displayed image 20 and moves the image 20 onto the new screen, i.e., pastes the image 20 onto the new screen.

Figure 12:
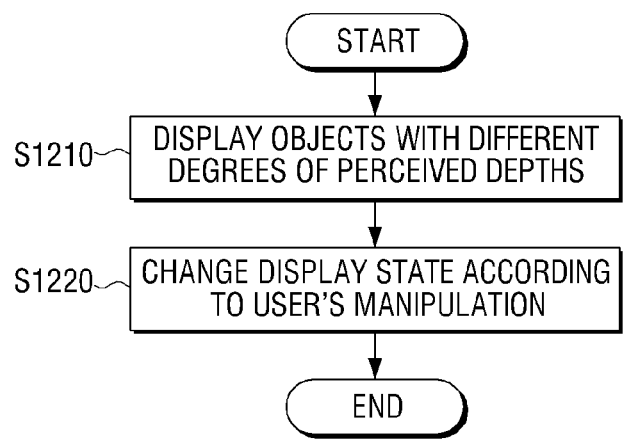

FIG. 12 illustrates a method for manipulating a 3D display terminal apparatus according to the present invention. Referring to FIG. 12, at S1210, the 3D display terminal apparatus displays objects with different degrees of perceived depths, using a 3D display method.

The user manipulates the objects using a plurality of touch modes, which may be perceived by degrees of perceived depths respectively corresponding to the objects. For example, the touch modes may include a near touch mode in which the touch is perceived at a predetermined distance from the screen, or a direct touch mode in which the direct touching on the screen is perceived. Additionally, the touch modes may include a pressing mode in which the user varies touch pressure while maintaining direct contact with the screen, or a long press mode in which the user touches on the screen for a time duration.

At S1220, when the object is operated by the various touch modes, the 3D display terminal apparatus changes the display status according to the user manipulation. As a result, functions such as copy & paste, or icon move are performed efficiently.

As explained above, the objects with the same degree of perceived depth are displayed and one from among the object is selected and displayed as a 3D image. However, other examples may be appropriately implemented. For example, the 3D display terminal apparatus may display objects with different degrees of perceived depths, i.e., in 3D display manner, according to the contents being displayed. In this case, the user may select the respective objects with appropriate touch modes corresponding to the respective degrees of perceived depths, without having to separately select the objects.

FIG. 13 illustrates the copy & paste operation according to an operating method of the present invention.

Referring to FIG. 13, at S1310, the objects are displayed, at S1315, a specific object is selected, and at S1320, a menu is displayed on one side of the selected object.

At S1325, if the user selects a copy menu from the displayed menu, at S1330, the selected object is protruded in the $Z^+$ direction and displayed as a 3D image.

In addition, the other objects presented on the existing screen may also be activated to undergo the same processing as explained above in response to a direct touch, to thus be added to and displayed as the 3D image. That is, there can be a plurality of objects protruding in the $Z^+$ direction.

At S1335, if a near touch is made with respect to the protruded image, the corresponding object is operated according to the state of the near touch.

That is, at S1340, if the portion activated by the near touch is moved while the distance is maintained, the location at which the protruding image is displayed is also moved in accordance with the direction and distance traveled by such movement.

However, at S1345, if direct touch is made when at least one image is protruding, the original screen, instead of the protruded image, is operated according to the state of the direct touch. That is, at S1350, if a need arises to change the screen to move to a new page or execute a new application, the screen is changed while the protruding image is maintained.

The state of the respective objects is manipulated using the near or direct touch mode.

At S1355, if the user inputs a direct touch while moving the object with the near touch, at S1360, the degree of perceived depth of the protruded object is returned to the original state, and the corresponding object is pasted on a spot on the current screen at which the direct touch is inputted. As a result, the selected object is copied onto and displayed on the new screen.

FIG. 14 illustrates an operating method according to the present invention.

Referring to FIG. 14, at S1410, objects are displayed, at S1420, a specific object is selected, and at S1430, the degree of perceived depth of the selected object is adjusted and displayed as a 3D image.

The object may be selected using a menu as explained above, or in accordance with a change in user's motion after touch, or simply by a touch.

At S1440, if the user inputs a command to switch layers when the plurality of objects is displayed as 3D images with different degrees of perceived depths, at S1450, according to the inputted layer switch command, the layers of the current screen and the protruded object are switched.

As explained above, the user is able to manipulate the object existing on the upper layer by touching the object. The user may additionally input a layer switch command to manipulate the object existing on the lower layer. As a result, the user may input touch and layer switching command as necessary until an intended result is obtained, and order change of display location, copy, or paste of the respective objects. At S1460, if the user inputs a paste command or a command to end the 3D display, the 3D display processing may be completed. A command to end the 3D display mode may be implemented in various forms such as selecting of a specific menu displayed on a screen, or various modes of touches including long press or double touch on the 3D displayed object.

As explained above, the user may manipulate the objects using the layer switch mode and direct touch mode altogether.

Meanwhile, the operating method according to embodiments of the present invention may be implemented as a program code and recorded in various types of computer-readable recording media. Specifically, the operation method herein may be written onto various forms of recording media readable at the terminal, such as Random Access Memory (RAM), flash memory, Read Only Memory (ROM), Erasable Programmable ROM (EPROM), Electronically Erasable and Programmable ROM (EEPROM), register, hard disk, removable disk, memory card, USB memory, or CD-ROM.

Accordingly, a program may be installed to execute the operating method explained above on an apparatus which may be connected to the recording media, or on which the recording media may be loaded.

In the present invention as explained above, the user is able to select and use the objects such as content or icons on the terminal apparatus with enhanced convenience.

The foregoing embodiments and advantages are merely examples and are not to be construed as limiting the present inventive concept. The present teaching can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A method for operating a terminal apparatus, the method comprising:
   displaying a screen including a plurality of objects on a display of the terminal apparatus;
   adjusting, in response to a user's manipulation in a touch mode for selecting an object from among the plurality of objects being received, a degree of depth of the selected object; and
   displaying the selected object in accordance with the adjusted degree of depth,
   wherein when the degree of depth of the selected object prior to the selection is such that the selected object is not displayed in a protruded form, the touch mode is a direct touch mode for touching a surface of the display to adjust the degree of depth of the selected object such that the selected object is displayed in the protruded form, and
   wherein when the degree of depth of the selected object prior to the selection is such that the selected object is displayed in the protruded form, the touch mode is a near touch mode for receiving touch input at an area spaced apart from the surface of the display to adjust the degree of depth of the selected object.

2. The method of claim 1, wherein the adjusting further comprises:
   displaying, in response to a selection of the object by the user's manipulation, a menu select window on one side of the selected object, and
   adjusting, in response to a selection of a copy menu from the displayed menu select window, the degree of depth of the selected object.

3. The method of claim 1, wherein the adjusting further comprises: adjusting, when the user's manipulation to select the object and rotate a spot of selecting the object in a preset direction or move in a preset pattern is received, the degree of depth of the selected object.

4. The method of claim 1, wherein the selected object is displayed in the protruded form in a three dimensional (3D) manner along a vertical direction from the surface of the display.

5. The method of claim 1, further comprising:
   changing, when the user's manipulation to select the object displayed in the protruded form in the near touch mode and the user's manipulation to move a spot of object selection is received, a location at which the protruded object is displayed according to movement of the spot.

6. The method of claim 1, further comprising:
   changing, when the selected object is displayed in protruded form, and a user's second manipulation in the direct touch mode is received, the screen according to the user's second manipulation in the direct touch mode, while maintaining the degree of depth of the selected object; and
   adjusting, when a user's third manipulation to select the selected object in the protruded form and directly touch at an area on the surface of the display is received, the degree of depth of the selected object to be displayed at the touched area on the surface of the display.

7. The method of claim 6, wherein the plurality of objects are contents.

8. The method of claim 1, further comprising:
   switching, when the degree of depth of the selected object is adjusted and a plurality of other objects having different degrees of depth are displayed and a layer switch command is inputted, the degree of depth of the selected object and the degree of depth of the plurality of other objects.

9. The method of claim 8, further comprising displaying a menu to input the layer switch command on an area of the screen.

10. The method of claim 6, wherein changing the screen comprises:
    changing, when, while the selected object is displayed in the protruded form, the user's manipulation in the direct touch mode to select an application is received, the screen to an application screen corresponding to the selected application.

11. The method of claim 1, wherein the displaying the screen comprises displaying the screen corresponding to a page among a plurality of pages, with the plurality of pages arranged in series with at least one object, and further comprising:
    changing, when the user's manipulation touching the surface of the display and moving the touched spot in a direction with a speed exceeding a threshold is received, the screen by turning a currently displayed page to a next page according to the direction of movement of the touched spot, while displaying the selected object in the protruded form.

12. The method of claim 11, wherein the plurality of objects are icons.

13. The method of claim 1, wherein the touch mode further includes at least one of a pressing mode for selecting the selected object by varying touch pressure while maintaining direct contact with the screen, and a long press mode for selecting the selected object by varying a duration of directly touching the screen.

14. A terminal apparatus comprising:
a display configured to display a screen including a plurality of objects;
a plurality of sensor units, wherein one sensor unit of the plurality of sensor units is configured to detect a user's manipulation; and
a processor configured to adjust, in response to the user's manipulation of a touch mode for selecting an object from among the plurality of objects being detected, a degree of depth of the selected object, and to control the display to display the selected object in accordance with the adjusted degree of depth,
wherein when the degree of depth of the selected object prior to the selection is such that the selected object is not displayed in a protruded form, the touch mode is a direct touch mode for touching a surface of the display to adjust the degree of depth of the selected object such that the selected object is displayed in a protruded form, and
when the degree of depth of the selected object prior to the selection is such that the selected object is displayed in a protruded form, the touch mode is a near touch mode for receiving touch input at an area spaced apart from the surface of the display to adjust the degree of depth of the selected object.

15. The terminal apparatus of claim 14, wherein the processor is further configured to control the display to display a menu select window on one side of the selected object, in response to a selection of the object by the user's manipulation, and to adjust the degree of depth of the selected object if a copy menu is selected from the menu select window.

16. The terminal apparatus of claim 14, wherein the processor is further configured adjust the degree of depth of the selected object, when the user's manipulation to select the object and rotate a spot of selecting the object in a preset direction or moves in a preset pattern is detected.

17. The terminal apparatus of claim 14, wherein the converting unit is further configured to adjust the degree of depth of the selected object so that the selected object is displayed in the protruded form along a vertical direction from the surface of the display in a three dimensional (3D) manner.

18. The terminal apparatus of claim 14, wherein when the user's manipulation to select the object displayed in the protruded from in the near touch mode and a user manipulation to move a spot of selecting the object is detected, the processor controls the display and to change a displayed location of the selected object according to movement of the spot.

19. The terminal apparatus of claim 14, wherein, when the selected object is displayed in protruded form and a user's second manipulation in the direct touch mode is detected, the processor controls the display to change the screen according to the user's second manipulation in the direct touch mode, while maintaining the degree of depth of the selected object, and
when a user's third manipulation to select the selected object in the protruded form and directly touch at an area on the surface of the display is received, the processor adjusts the degree of depth of the selected object to be displayed at the touched area on the surface of the display.

20. The terminal apparatus of claim 19, wherein the plurality of objects are contents.

21. The terminal apparatus of claim 14, wherein, when the degree of depth of the selected object is adjusted so that a plurality of other objects with different degrees of depth are displayed, and a layer switch command is inputted, the processor controls to switch the degree of depth of the protruded selected object and of the plurality of other objects, and to display a result thereof.

22. The terminal apparatus of claim 21, wherein the display unit displays a menu to input the layer switch command of an area on the screen.

23. The terminal apparatus of claim 19, wherein, when, while the selected object is displayed in the protruded form, the user's manipulation in the direct touch mode to select an application is received, the processor controls the display so that the screen is changed to an application screen corresponding to the selected application.

24. The terminal apparatus of claim 14, wherein the display displays the screen corresponding to a page among a plurality of pages, with the plurality of pages arranged in series with at least one object, and when the user's manipulation touching the surface of the display moving the touched spot in a predetermined direction with a speed exceeding a threshold is detected, the processor controls the display so that the screen is changed by turning a currently displayed page to a next page according to the predetermined direction, while the selected object is maintained in the protruded form.

25. The terminal apparatus of claim 24, wherein the plurality of objects are icons.

26. The terminal apparatus of claim 14, wherein the touch modes further include at least one of a pressing mode for selecting the selected object by varying touch pressure while maintaining a direct contact with the screen, and a long press mode for selecting the selected object by varying a time of directly touching the screen.

27. The terminal apparatus of claim 14, wherein the plurality of sensor units comprise:
a first sensor unit which detects a direct touch by which the display is directly touched, and
a second sensor unit which detects a near touch by which a touch is made within a distance range to the display.

* * * * *